United States Patent [19]

O'Brien et al.

[11] Patent Number: 5,098,200
[45] Date of Patent: Mar. 24, 1992

[54] DUAL RANGE TEMPERATURE MONITORING CIRCUITS

[75] Inventors: Michael J. O'Brien, Churchville; Kenneth A. Johnson, Walworth; Charles E. Ellis, Jr., Phelps, all of N.Y.

[73] Assignee: MDT Corporation, Torrance, Calif.

[21] Appl. No.: 649,473

[22] Filed: Feb. 1, 1991

[51] Int. Cl.⁵ .............................................. G01K 7/00
[52] U.S. Cl. ...................................... 374/163; 374/168
[58] Field of Search ................ 374/163, 168, 170, 172

[56] References Cited

U.S. PATENT DOCUMENTS

| | | |
|---|---|---|
| 3,128,946 | 4/1964 | Hoberman. |
| 3,986,393 | 10/1976 | Hawley ............................ 374/172 |
| 4,505,600 | 3/1985 | Suzuki et al. ..................... 374/163 |
| 4,607,962 | 8/1986 | Nagao et al. ..................... 374/170 |
| 4,725,150 | 2/1988 | Ishida et al. ..................... 374/163 |

FOREIGN PATENT DOCUMENTS

| | | | |
|---|---|---|---|
| 0237898 | 7/1986 | German Democratic Rep. ............................... | 374/163 |
| 0210734 | 9/1988 | Japan .................. | 374/163 |
| 0201128 | 8/1989 | Japan .................. | 374/163 |
| 0718725 | 2/1980 | U.S.S.R. ............... | 374/172 |
| 1497466 | 7/1989 | U.S.S.R. ............... | 374/163 |

OTHER PUBLICATIONS

Gupta, S. C., et al., "Universal Temperature Controlling and Measuring System," J. Inst. Eng. (India), Electri. Eng. Div. pt. EL(1), vol. 60 (Aug. 1979) pp. 7-8.

Primary Examiner—William A. Cuchlinski, Jr.
Assistant Examiner—Diego F. F. Gutierrez
Attorney, Agent, or Firm—Trask, Britt & Rossa

[57] ABSTRACT

A temperature monitoring system provides a first, coarse temperature output signal, and a second, fine temperature output signal based on the first, coarse output signal. The fine output signal has a higher resolution than the coarse output signal, and permits fine temperature control of an apparatus at a variable control output. The fine output signal is automatically calibrated upon switching from the coarse to the fine signal.

9 Claims, 5 Drawing Sheets

DUAL RANGE TEMPERATURE MONITORING CIRCUITS

BACKGROUND

1. Field

The invention relates to temperature monitoring apparatus, and more particularly, pertains to circuits providing both coarse and fine resolution signals for temperature measurement and control.

2. State of the Art

Numerous types of equipment use electronic temperature control systems. For some apparatus such as sterilizers, autoclaves, dryers and the like, the temperature controller must be capable of control over a wide temperature range. In addition, fine temperature control and temperature indication in a narrow band about the control point is desirable. When the control point or setpoint is to be variable from cycle to cycle, means must be provided for achieving the variable control. The use of separate independent temperature measurement channels typically results in an expensive system requiring manual calibration of both channels.

The need exists for a simple, dual-range temperature monitoring circuit which is simple, inexpensive, accurate and easy to calibrate.

SUMMARY OF THE INVENTION

A dual range temperature monitoring apparatus is useful for the indication, recording and/or control of the temperature of devices requiring temperature monitoring or control. Included in the wide variety of such devices are sterilizers, ovens, dryers, incubators, and the like.

Using a single RTD, i.e. resistance temperature devices, such as a diode, thermistor or thermocouple, a first circuit produces a coarse voltage output signal, i.e. having a relatively low voltage/° C. ratio over a wide temperature range. A second circuit limits the coarse voltage output to a narrower temperature range, converting it to a relatively high voltage/° C. ratio signal, i.e. resolution. Thus, a coarse circuit produces a relatively low resolution signal while the fine circuit produces a relatively high resolution signal. The first (coarse) circuit may be used, for example, to establish a fixed accuracy of the measurement while the second (fine) circuit is used for detecting small changes in temperature about a particular setpoint.

The coarse and fine analog output signals produced with all-electronic components and the fine resolution of the fine output signal permit more precise temperature measurement conditions.

Broadly, this invention provides a system which includes a dual range circuit for monitoring temperature, particularly the temperature of an apparatus such as a sterilizer. The circuit includes temperature measuring means to establish a first variable analog voltage signal as a function of a measured variable temperature; means for communicating that first voltage signal to a signal processor, which may be one of either a temperature controller, a temperature indicator, a recorder or other such device as desired, in any event including a circuit for converting that voltage signal to a corresponding temperature; electronic amplification means to receive and modify the first voltage signal by a constant amplification factor to establish a second variable analog voltage signal wherein the first signal has a first voltage-to-temperature (V/T) resolution and the second signal has a second V/T resolution differing from the first V/T resolution; electronic voltage level shifter means to shift the absolute values of the first signal by a constant value to produce corresponding shifted second voltage signals corresponding to the measured temperatures; means for communicating the shifted second voltage signals to the selected signal processor; and comparison means for comparing the shifted second voltage signal to the first voltage signal at the same measured temperature and computing the actual temperature based on the shifted second voltage signal corrected by the second V/T resolution.

The system may also include switching means for selectively applying to the signal processor either the first voltage signal or the shifted second voltage signal. The selected signal processor may be a controller, including digital control means having memory and an analog-to-digital converter and switching means associated with the control means. The controller memory may contain encoded instructions for switching from the first voltage signal to the second voltage signal at a preselected temperature and simultaneously comparing those first and second signals to establish a V/T function of the second voltage signal for subsequently obtained values for the second voltage signal. The controller memory may also contain encoded instructions for switching from the second voltage signal to the first voltage signal.

The amplification factor may be either greater or less than unity, and the second V/T resolution may be either greater or less than the first V/T resolution. The first voltage signal may be a coarse signal for monitoring a first range of temperatures and the second voltage signal may be a fine signal for monitoring a second range of temperatures. Alternatively, the first signal may be fine and the second signal coarse to monitor first and second temperature ranges. In either case, the range of temperatures monitored by the fine signal comprises a portion of the range monitored by the coarse signal.

BRIEF DESCRIPTION OF THE DRAWINGS

In the drawings, which illustrate what is currently regarded as the best mode for carrying out the invention.

DESCRIPTION OF THE ILLUSTRATED EMBODIMENT

Figure 1:
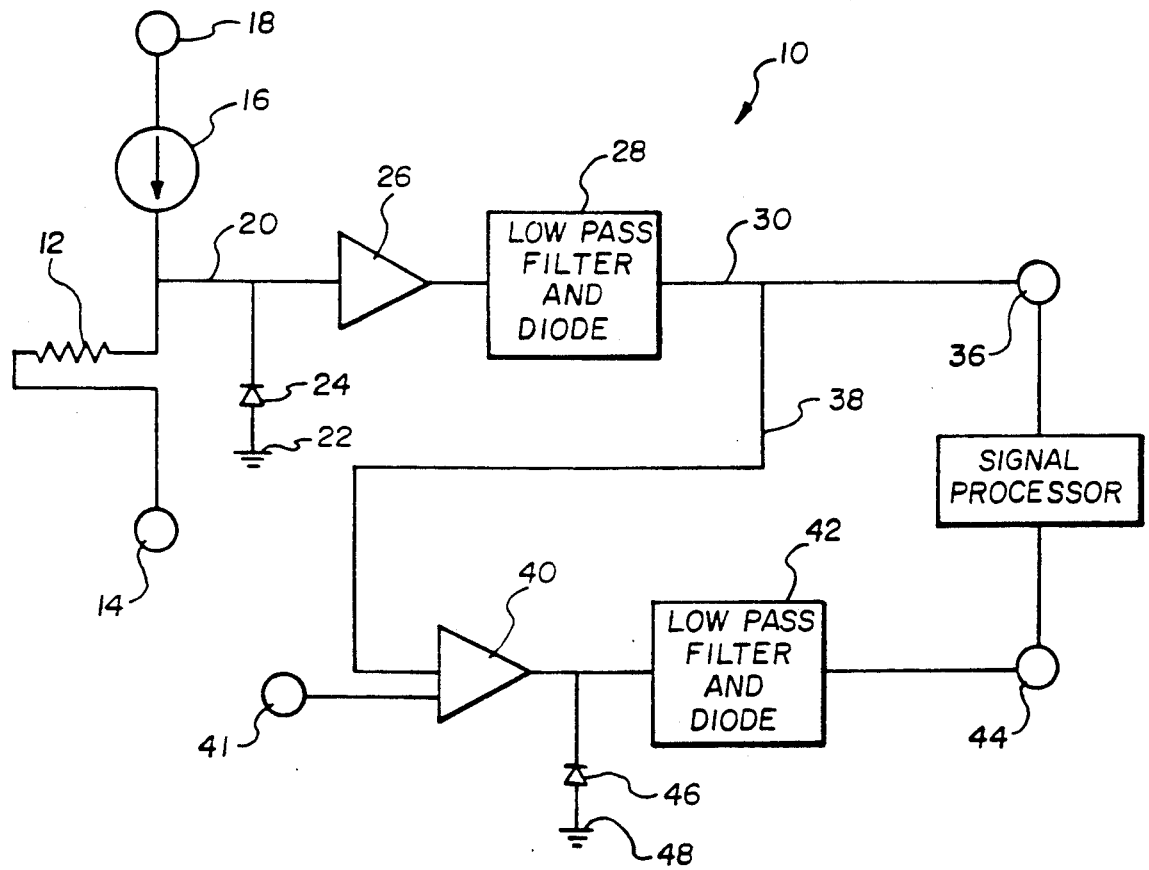
FIG. 1 is a block diagram of the electronic circuit of the invention.

The analog circuit of the invention is generally shown in FIG. 1. The temperature monitoring system 10 includes a resistance temperature device 12 electrically connected between a constant voltage source 14 and a constant dc current source 16. The input to the latter is shown as a dc power supply 18, typically of low voltage such as +15 volts. The resistance temperature device 12 is temperature sensitive, i.e. its resistance changes with temperature. Preferably, the resistance of device 12 is a linear function of temperature, or nearly so, over the temperature range of use. The function may be either positive or negative. More typically, the function is positive, i.e. resistance increases with increasing temperature.

As the resistance of the resistance temperature device 12 changes, the voltage across it also changes in accordance with Ohm's law. Thus, a voltage or emf signal is produced in conduit 20 which is directly related to the temperature of device 12. The device 12 is placed in a location appropriate for measurement of the temperature to be monitored. Conduit 20 is connected to ground 22 through rectifier 24 for negative voltage protection.

The voltage signal in conduit 20 is amplified in first amplifier circuit 26 and then passed through a low-pass filter and precision diode 28 to filter out undesirable noise in the signal and limit the output voltage in conduit 30 between a lower and upper level. Terminal 36 thus carries a first smoothed voltage signal which is easily calibrated by adjustment of the voltage from DC voltage source 14 and the current from DC current source 16.

In accordance with the invention, additional electronic circuitry is provided to amplify the first voltage signal in conduit 30 by a constant amplification factor, thus producing an enhanced second voltage signal which has a higher V/T resolution, i.e., the incremental voltage change per ° C. change in temperature. It is a "fine" signal relative to the first voltage signal, which is a "coarse" signal by comparison.

The first voltage signal from conduit 30 is amplified in differential amplifier circuit 40. In addition, the circuit 40 shifts the voltage level to a level appropriate for its communication to a controller, indicator, recorder, etc., not shown. Differential amplifier circuit 40 uses voltage reference 41 for achieving the desired voltage shift.

The amplified voltage signal is then passed through a second low-pass filter and precision diode 42 to filter out noise and limit the output voltage signal at terminal 44 between a desired lower and an upper level. The circuit also includes rectifier 46 connected to ground 48 for negative voltage protection.

The second or fine output shifted voltage signal at terminal 44 has a higher V/T resolution than the first or coarse voltage signal.

The invention is particularly applicable to temperature control of an apparatus such as a sterilizer. If the controller of the apparatus uses a digital microprocessor, an analog-to-digital (A/D) converter is necessary for converting the coarse and fine analog voltage signals to a digital equivalent.

In such a system, a preferred method of operation includes initial use of the coarse signal for temperature indication and control, up to the sterilization temperature setpoint. When the setpoint is reached, the microprocessor switches to the fine signal for controlling at the setpoint. The higher resolution enables faster response of the controller to temperature changes, and finer control of the temperature.

Instruction for switching back to the coarse signal may also be incorporated in the controller software.

Figure 2:
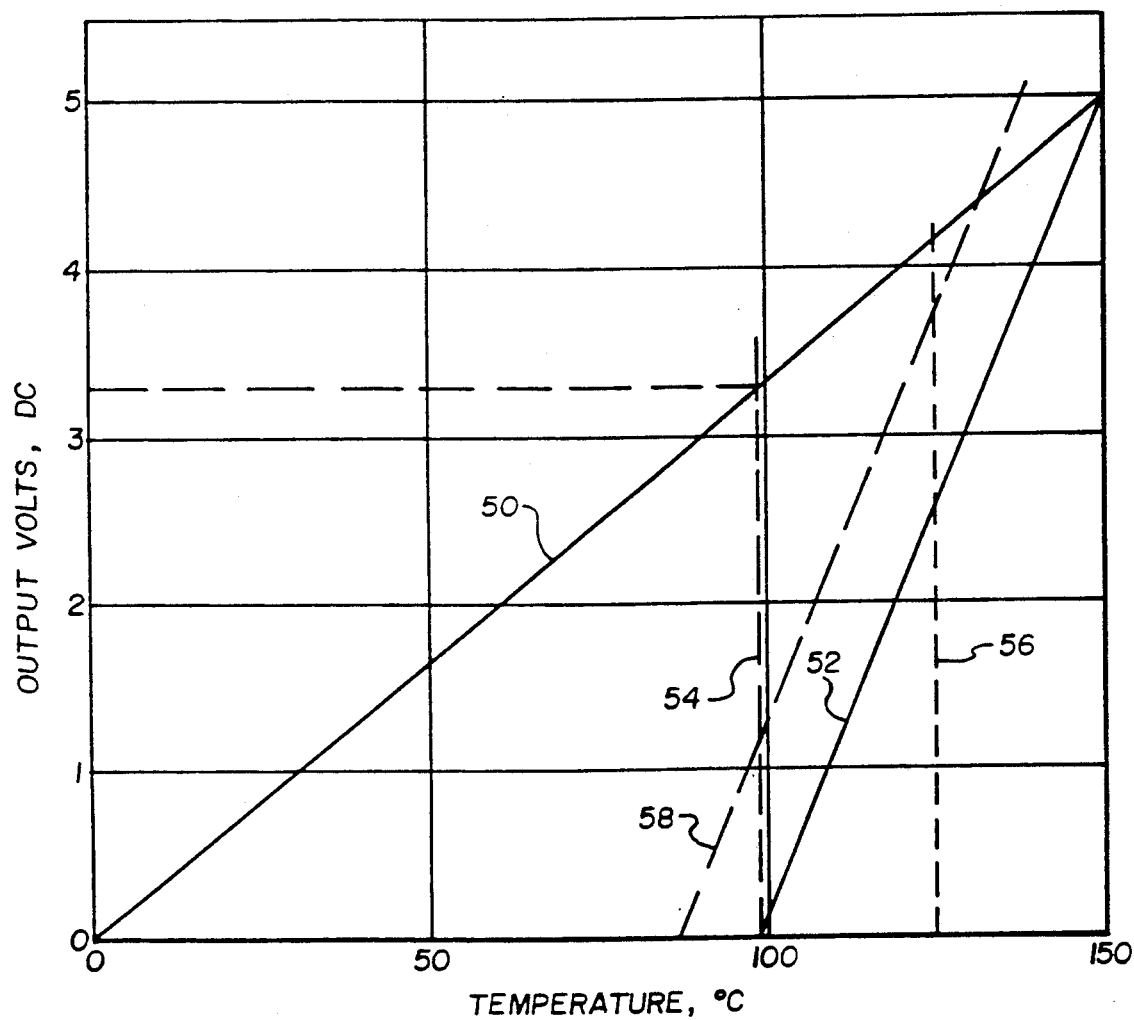
FIG. 2 is a graphical diagram of exemplary temperature-output voltage relationships of the invention.

FIG. 2 shows an exemplary relationship between the voltage or emf outputs for the coarse and fine monitoring circuits. Curve 50 represents the coarse output voltage signal as a linear function of the temperature of an apparatus such as a sterilizer. The circuit is calibrated to provide a signal of 0.0 volts at 0° C. and 5.0 volts at 150° C. Thus, the voltage-to-temperature (V/T) signal resolution is (5.0 v. −0.0 v.)÷(150° C.−0° C.)=0.0333 v/° C. or 33.3 mv/° c. The temperature indicator, recorder or controller to which the output signals are directed in this example is designed to operate over a voltage signal of 0–5 volts DC.

A secondary or fine output voltage signal shown as curve 52 is obtained by modification of the coarse output signal and is desired to provide an output signal of 0.0 volts at 98.8° C. (see line 54) and 5.0 volts at 150° C. The V/T signal resolution is thus (5.0 v −0.0 v)÷(150°−98.8° C.)=0.0976 v/° C. or 97.6 mv/° C. Thus, the signal amplification for the fine circuit is 97.6/33.3 or 2.93. The circuits may be designed to accommodate the operating ranges and resolutions of the particular temperature indicators or controller(s) to be used.

Response curves for resistance temperature devices are often linear or nearly linear. Thus, the response curve of the circuits may be expressed by:

$$V = V_0 + (T - T_0)S$$

where

V = voltage output signal, volts,
$V_0$ = known voltage, volts corresponding to a known temperature $T_0$, ° C.,
T = actual temperature of apparatus, ° C.,
$T_0$ = temperature, ° C. of apparatus where voltage $V_0$ is known, and
S = resolution, volts per ° C.

The resolutions of the coarse and fine temperature channels are essentially constant if an appropriate RTD is selected. Thus, the fine voltage response may be easily calibrated from the coarse voltage response by comparing the voltage values at any specific known temperature within the applicable temperature range. Any variation in temperature from that value may be specifically determined for the fine channel as:

$$T = T_0 + \frac{(V - V_0)}{S}.$$

Thus, in FIG. 2, the calibration of fine curve 52 with respect to coarse curve 50 may be made merely by measuring the fine voltage $V_0$ at a given known temperature $T_0$ such as 98.8° C. The resolution of the fine circuit curve 52 is, as previously shown for this example, 0.0976 volt/° C. Since $V_0 = 0.0$ for this example, the equation for curve 52 is $$T = 98.8 + \frac{(V - 0.0)}{0.0976}.$$

For controlling the temperature of a sterilizer oven, a similar apparatus, digital memory in the controller of the apparatus may be programmed to use the coarse voltage signal for a heat-up period. When the desired temperature control point is reached, the controller switches from the coarse voltage signal, for which it calculates a temperature, to the fine voltage signal and simultaneously determines the voltage difference, i.e. voltage shift between the two. The equation for the curve is thus determined for calculating the actual temperature from the fine voltage signal.

The particular temperature at which the switch takes place is unimportant, as long as the temperature is within the range of the fine circuit. Thus, in FIG. 2, the switching operation could have occurred when the temperature $T_0$ was 125° C. along line 56. At that point, $V_0 = 2.557$ volts and the equation for curve 52 is $$T = 125 + \frac{(V - 2.557)}{0.0976}$$

which provides the same result as the curve calculated at $V_0 = 0.0$ volts.

For purposes of calibration, it is unimportant whether the circuits are manufactured to have any exact shift voltage value between the coarse and fine response curves 50 and 52. Each time the controller switches to the fine response curve, the curve is calibrated. Thus, if the true fine response curve 58 varied from line 56 as shown, the same mathematical expression would result. In this case, however, the temperature measuring range of the fine circuit may be further limited because of possible overvoltage at the highest temperatures. The available temperature measurement range which produces a 0–5 v signal is moved to a lower temperature range, i.e. 86.5° to 187.7° C.

By varying the voltage shift for the fine voltage curve, the measurement range of the fine circuit may be adapted to a fine temperature range anywhere within the coarse temperature range.

Figure 3:
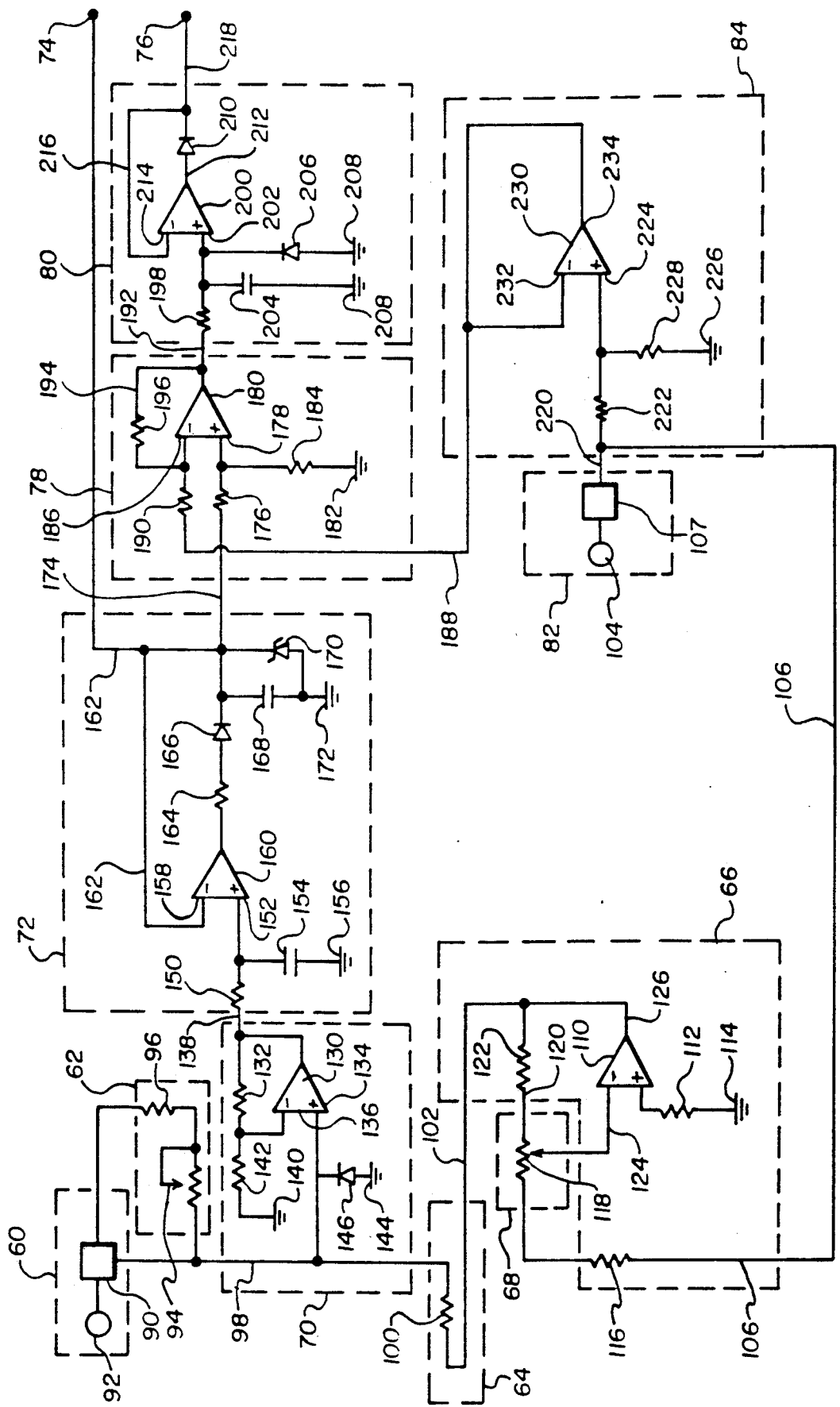
FIG. 3 is a detailed circuit diagram of the invention.
Figure 4:
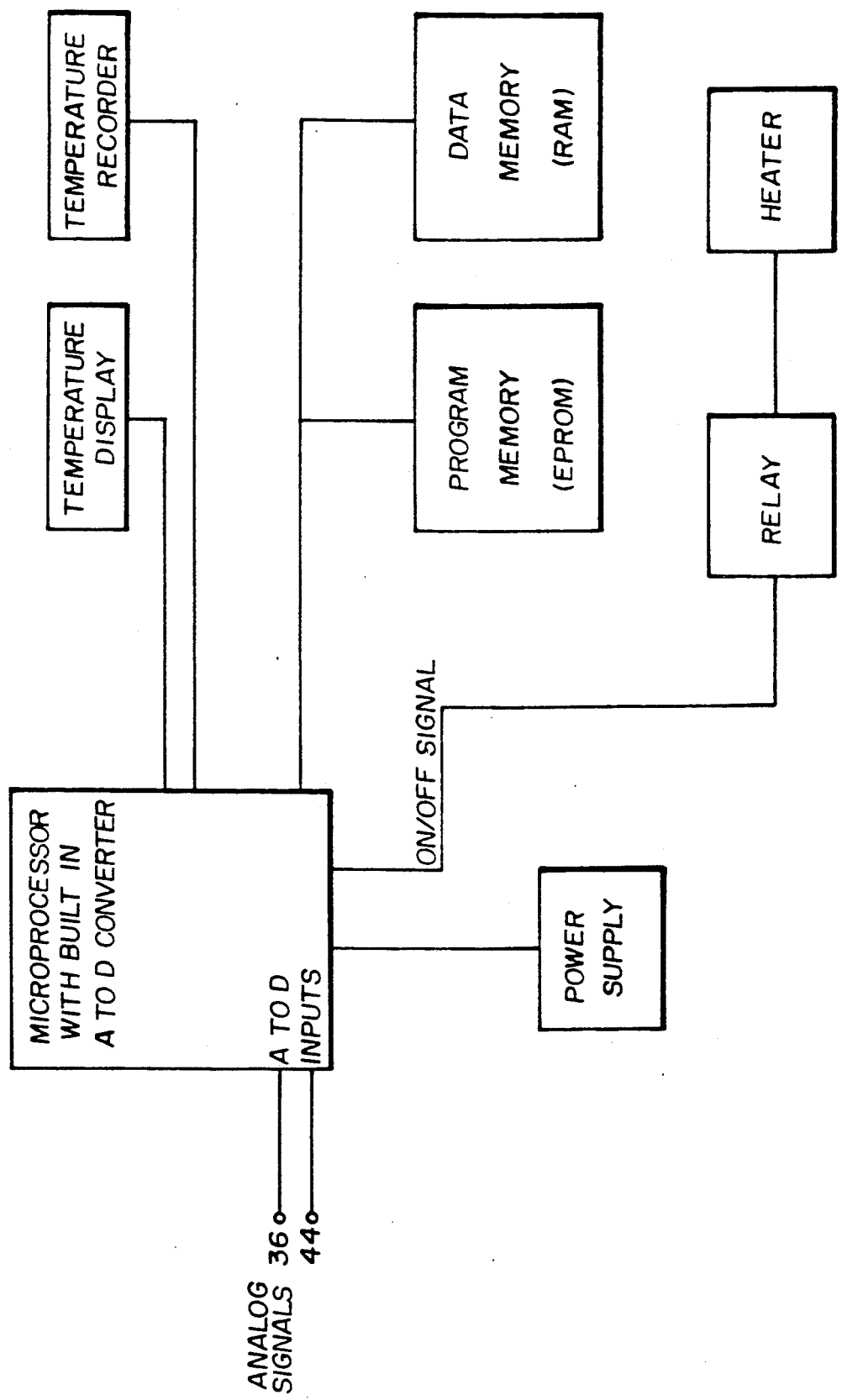
FIG. 4 is a block diagram of the signal processing components of the invention.
Figure 5:
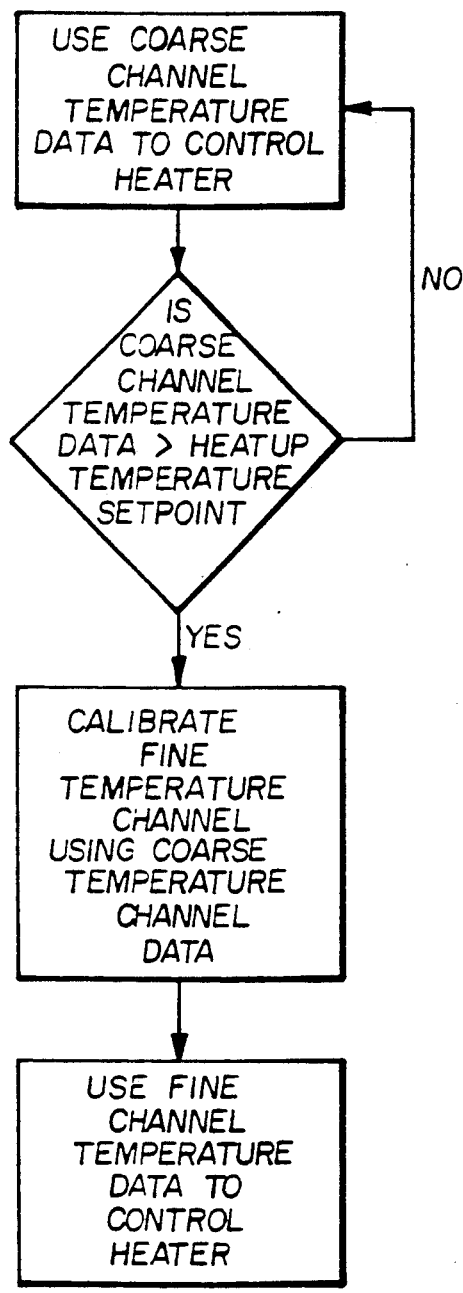
FIG. 5 is a logic flow diagram pertinent to the arrangement of FIG. 4.

FIG. 3 illustrates a preferred embodiment of the invention, using an RTD as the temperature sensor. The circuit may be divided into several electronic subcircuits represented in the drawing by blocks. This assembly of subcircuits is applicable to any temperature sensing device which has a variable temperature coefficient of resistance.

In FIG. 3, a constant current subcircuit 60 provides a constant electrical current which may be adjusted by current source adjust subcircuit 62. The resistance temperature device 64 has a variable resistance whose value is temperature dependent. Power supply subcircuit 66 provides a constant voltage which is adjusted by voltage adjustment subcircuit 68.

The voltage signal from the resistance temperature device 64 is amplified in first amplifier stage 70 and filtered in first filter/protection stage 72. The coarse emf or voltage output in terminal 74 from stage 72 is a filtered and amplified electronic emf signal which may be directed to a temperature indicator, recorder, and/or controller.

Subcircuits 60 through 74 together comprise a coarse temperature monitoring circuit which produces a relatively coarse emf or voltage signal. In other words, the signal emf-to-temperature ratio, herein demonstrated as signal resolution, is relatively low.

A fine emf output signal 76 is also generated by treatment of the coarse output 74. First voltage level shifter 78 shifts the coarse output voltage of signal 74 to a lower voltage level, and amplifies the signal. Second filter/protection stage 80 filters noise from the emf signal from shifter 78 and limits the emf range of the signal 76 to the limits of the final control, indicating or recording device which will receive the output signal.

Precision voltage reference 82 provides a reference used by power supply subcircuit 66 and second voltage level shifter 84 for determining the voltage applied to resistance temperature device 64 and the quantitative voltage shift. Second voltage level shifter 84 shifts the reference voltage level from reference 82 to a constant level useful by first voltage level shifter 78.

Turning now to the details of the circuits and subcircuits of FIG. 3, constant current subcircuit 60 is shown as comprising a constant current generator 90 receiving electrical power from power source 92. Power source 92 is typically a low voltage, e.g. 15V DC source.

Current source adjust subcircuit 62 includes an adjustable resistor, i.e. potentiometer 94 and a constant resistance 96. Potentiometer 94 is typically manually adjustable for initial calibration of the temperature monitoring system.

Subcircuits 60 and 62 work together to apply a constant, adjustable current to conduit 98 and thus to one side of the resistance temperature device 64 as its excitation current.

Resistance temperature device 64 is represented as a resistance 100 which is highly temperature dependent. Device 64 may be a conductor or semiconductor such as a temperature dependent diode (or thermistor). Semiconductors are generally preferred over metallic resistors because of greater sensitivity to temperature change. Preferably, the temperature response is linear, or nearly so, over the temperature range of interest. The particular device 64 selected has a positive, or alternatively, a negative temperature response, depending upon the particular application.

The resistance temperature device 64 is shown as having a constant voltage applied to one side of resistance 100 via conduit 102. This constant voltage is provided by power supply subcircuit 66 and voltage adjustment subcircuit 68 acting on a constant reference voltage in conduit 106. This voltage is provided by a constant reference voltage power supply 107 obtaining power from source 104.

Subcircuit 66 includes a DC amplifier 110 having the positive input terminal connected to one side of fixed resistor 112, the latter having its opposite side connected to ground 114. Conduit 106 is connected to a fixed resistor 116 having its opposite side connected to one side of variable resistor 118. Conduit 120 connects conduit 102 through fixed resistor 122 to the opposite side of variable resistor 118. The adjustable tap 124 of the variable resister 118 is applied to the negative input terminal of amplifier 110, and the amplifier output 126 is connected to conduit 102. The variable resistor 118 is preset to provide the desired constant voltage to the device 64.

First amplifier stage 70 includes a DC amplifier 130 connected to its positive input terminal 134 to conduit 98 for amplification of the voltage signal from the resistance temperature device 64. The amplification circuit includes fixed resistance 132 between the amplifier negative input terminal 136 and first amplifier stage output 138. Input terminal 136 is also connected to ground 140 through fixed resister 142. Conduit 98 is connected to ground 144 through rectifier 146.

The voltage signal passes from the first amplifier stage 70 through a fixed resistance 150 and to the positive input terminal 152 of an operational amplifier 160 in first filter/protection stage 72. The input terminal leads to a condenser 154 having its opposite side connected to ground 156.

The negative terminal 158 of amplifier 160 is connected through conduit 162 to the first (coarse) voltage output terminal 74. The amplifier output conduit 164 includes circuitry for filtering out unwanted noise signals and for limiting the voltage so that it varies within the limits required by the particular controller indicator or recorder, etc. This circuitry includes fixed resistor 164, rectifier 166, condenser 168 and breakdown diode or limiter 170, the latter two elements connected to ground 172.

The particular circuitry for providing the first coarse voltage signal need not be precisely as described herein, provided that a calibratable coarse signal results, and that the coarse signal is then treated by amplification to provide a second, automatically calibrated, fine signal of higher V/T resolution.

The circuitry for achieving a secondary voltage signal is depicted as including a first voltage level shifter 78, second filter/protection stage 80 and a second voltage lever shifter 84.

The first voltage signal is directed in conduit 174 through fixed resistor 176 to the positive input terminal 178 of operational amplifier 180. The input terminal 178 is also connected to ground 182 through fixed resistor 184.

A constant reference voltage is provided to the negative input terminal 186 of amplifier 180. This voltage signal is communicated from second voltage level shifter 84 in conduit 188 having fixed resistor 190.

The negative terminal 186 is connected to the amplifier output conduit 192 through conduit 194 with resistor 196.

As previously described, first voltage level shifter 78 amplifies the coarse signal, but also shifts the voltage by a given amount. The shifted voltage signal in conduit 192 is passed through fixed resistor 198 to operational amplifier 200. The positive input terminal 202 of the amplifier 200 is connected with circuitry for filtering out unwanted noise and limiting the output voltage to the desired range. This circuitry includes resistor 198, capacitor 204 and rectifier 206, the latter two connected to ground 208.

A rectifier 210 is placed in the amplifier output conduit 212, the former also being connected to the negative input terminal 214 of the amplifier 200 by conduit 216. The final amplified shifted fine voltage signal passes through conduit 218 to terminal 76. The signals from terminals 74 and 76 are alternatively directed to a controller, temperature indicator, recorder or other such device as desired.

As already described, constant reference voltage power supply 107 receives power from source 104 which may be the same as source 92. Voltage reference supply 107 provides a constant reference voltage for the power supply subcircuit 66 and for the first voltage level shifter 78, through second voltage level shifter 84. The constant reference voltage signal in conduit 220 is passed through fixed resistor 222 to the positive input terminal 224 of amplifier 230. The input terminal is connected to ground 226 through resistor 228. The negative input terminal 232 and output terminal 234 are connected to conduit 188 to provide a constant voltage range to amplifier 180.

The invention has been described as means for producing a fine voltage signal with high resolution from a coarse voltage signal with lesser resolution. Alternatively, a coarse signal could be generated from a first fine signal. Such configuration may provide a slightly higher absolute accuracy in controlling at the setpoint with the fine channel. The fine channel does not require calibration against the coarse channel, but the reverse is true in such a configuration.

The invention is simple and easily constructed of readily available parts. When configured with a microprocessor controller, the switching between coarse and fine channels is done automatically, as is the calibration of the second channel relative to the first channel. Thus, automation is assured.

The amplification ratio from the coarse signal to the fine signal may be varied to suit the particular requirements for least significant bit values in a digital control system and achieve significant improvement in temperature control.

When the process requires fine temperature control at several widely differing temperatures, two or more high resolution amplification circuits may be used, each separately treating the coarse voltage signal to generate an amplified voltage signal applicable to the particular controlled temperature. Thus, where it is desirable to control the temperature alternatively at 0° C. and 125° C. and the final control elements at each temperature have widely differing operating characteristics, a separate amplification circuit for each temperature control point may be used, while the coarse signal is used in traversing over the broad range, including from one control point to the other.

EXAMPLE

With reference to FIGS. 1 and 2, a platinum RTD is used which has a resistance of 1000 ohms at 0° C. and which resistance varies with temperature at a ratio of 3.85 ohms per ° C. The RTD is energized by a 5 mA constant current and is connected to a −5 VDC source. The first (coarse) amplification stage has a voltage amplification factor of 1.732 and the second (fine) amplification stage has an amplification factor of 2.932. The resulting temperature-voltage curves 50 and 52 are depicted in FIG. 2. The temperature controller for a sterilizer uses 9 bits of a 10 bit A/D converter having a total of 512 steps over the 5 volt measurement range. Thus, measurements using the coarse curve 50 has a least significant bit (LSB) which corresponds to 0.293 ° C. The fine curve 52 has a least significant bit corresponding to 0.1° C., a considerable increase in resolution. Control of the sterilization temperature is enhanced.

What is claimed is:

1. A dual range monitoring system for monitoring the temperature of an apparatus, comprising:
    temperature measuring means to establish a first variable analog voltage signal as a function of a measured variable temperature;
    means for communicating said first voltage signal to a signal processor including a circuit for converting said first voltage signal to a corresponding temperature;
    electronic amplification means to receive and modify said first voltage signal by a constant amplification factor to establish a second variable analog voltage signal wherein said first voltage signal has a first voltage-to-temperature (V/T) resolution and said second voltage signal has a second V/T resolution differing from said first V/T resolution;
    electronic voltage level shifter means to shift the absolute values of said second voltage signal by a constant value to produce shifted second voltage signals corresponding to said measured temperatures;
    means for communication said shifted second voltage signals to said signal processor; and
    comparison mean for comparing said shifted second voltage signal to said first voltage signal at the same measured temperature, and computing the actual temperature based on said shifted second voltage signal corrected by said second V/T resolution.

2. The monitoring system of claim 1, further comprising switching means for switching the voltage signal communicating with said signal processor from one of said first voltage signal and said shifted second voltage signal to the other.

3. The monitoring system of claim 2, wherein said signal processor is a controller, including digital control means having memory and an analog-to-digital converter, switching means associated with said control means.

4. The monitoring system of claim 3, further comprising encoded instructions in said controller memory for switching said voltage signal from said first voltage signal to said second voltage signal at a preselected temperature and simultaneously comparing said second voltage signal with said first voltage signal to establish a voltage-to-temperature function of said second voltage signal for subsequently obtained values of said second voltage signal.

5. The monitoring system of claim 4, further comprising instructions in said controller memory for switching from said second voltage signal to said first voltage signal.

6. The monitoring system of claim 1, wherein said amplification factor is greater than unity, and said second V/T resolution is greater than said first V/T resolution.

7. The monitoring system of claim 6, wherein said first voltage signal is a coarse signal for monitoring a first range of temperatures and said shifted second voltage signal is a fine signal for monitoring a second range of temperatures, said second range of temperatures comprising a portion of said first range of temperatures.

8. The monitoring system of claim 1, wherein said amplification factor is less than unity, and said second V/T resolution is less than said first V/T resolution.

9. The monitoring system of claim 8, wherein said first voltage signal is a fine signal for monitoring a first range of temperatures and said shifted second voltage signal is a coarse signal for monitoring a second range of temperatures, said first range of temperatures comprising a portion of said second range of temperatures.

* * * * *